(12) United States Patent
Abd Elhamid et al.

(10) Patent No.: US 7,700,212 B2
(45) Date of Patent: Apr. 20, 2010

(54) BIPOLAR PLATE WITH ENHANCED STABILITY

(75) Inventors: Mahmoud H. Abd Elhamid, Grosse Pointe Woods, MI (US); Gayatri Vyas, Rochester Hills, MI (US); Youssef M. Mikhail, Sterling Heights, MI (US); Richard H. Blunk, Macomb Township, MI (US); Daniel J. Lisi, Eastpointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 395 days.

(21) Appl. No.: 10/960,489

(22) Filed: Oct. 7, 2004

(65) Prior Publication Data

US 2006/0078776 A1    Apr. 13, 2006

(51) Int. Cl.
   *H01M 8/02*    (2006.01)
   *B32B 15/00*    (2006.01)

(52) U.S. Cl. ......................................... 429/34; 428/685
(58) Field of Classification Search .................. 429/34; 428/685
   See application file for complete search history.

(56) References Cited

U.S. PATENT DOCUMENTS

| | | | | |
|---|---|---|---|---|
| 4,915,752 A | * | 4/1990 | Culling | 148/327 |
| 5,250,162 A | * | 10/1993 | Foller et al. | 205/687 |
| 5,268,045 A | * | 12/1993 | Clare | 148/518 |
| 5,376,464 A | * | 12/1994 | Dupoiron et al. | 428/679 |
| 5,624,769 A | * | 4/1997 | Li et al. | 429/32 |
| 5,643,690 A | * | 7/1997 | Tateishi et al. | 429/34 |
| 6,228,522 B1 | | 5/2001 | Batawi et al. | |
| 6,322,919 B1 | * | 11/2001 | Yang et al. | 429/34 |
| 6,372,376 B1 | | 4/2002 | Fronk et al. | 429/41 |
| 6,454,922 B1 | * | 9/2002 | Weisbrod | 204/404 |
| 6,649,031 B1 | | 11/2003 | Iqbal et al. | |
| 6,699,593 B2 | * | 3/2004 | Kaneta et al. | 428/670 |
| 7,150,918 B2 | * | 12/2006 | Brady | 428/457 |
| 2001/0006702 A1 | * | 7/2001 | Hisada et al. | 427/115 |
| 2002/0187379 A1 | | 12/2002 | Yasuo et al. | |
| 2003/0099847 A1 | * | 5/2003 | Cunningham et al. | 428/469 |
| 2003/0170526 A1 | * | 9/2003 | Hodgson et al. | 429/34 |
| 2003/0228512 A1 | | 12/2003 | Vyas et al. | 429/38 |
| 2004/0005502 A1 | | 1/2004 | Schlag | |
| 2004/0091768 A1 | | 5/2004 | Abd Elhamid et al. | 429/42 |
| 2004/0101738 A1 | * | 5/2004 | Tawfik et al. | 429/38 |
| 2004/0197593 A1 | | 10/2004 | Chellappa | |
| 2005/0017055 A1 | | 1/2005 | Kurz et al. | |

(Continued)

FOREIGN PATENT DOCUMENTS

JP    06310153    11/1994

(Continued)

OTHER PUBLICATIONS

IPDL Machine Translation of JP 10-228914.*

(Continued)

*Primary Examiner*—Gregg Cantelmo
(74) *Attorney, Agent, or Firm*—Reising Ethington P.C.

(57) ABSTRACT

An enhanced stability and inexpensive bipolar plate for a fuel cell is disclosed. The enhanced stability bipolar plate includes a bipolar plate substrate and a corrosion-resistant coating thermally sprayed on the bipolar plate substrate. A method for enhancing corrosion resistance of a bipolar plate is also disclosed.

15 Claims, 2 Drawing Sheets

U.S. PATENT DOCUMENTS

| | | |
|---|---|---|
| 2005/0025897 A1 | 2/2005 | Van Steenkiste et al. |
| 2005/0037212 A1 | 2/2005 | Budinski |
| 2005/0037935 A1 | 2/2005 | Elhamid et al. |
| 2006/0019142 A1 | 1/2006 | Elhamid et al. |

FOREIGN PATENT DOCUMENTS

| | | | |
|---|---|---|---|
| JP | 10228914 | | 8/1998 |
| JP | 10228914 A | * | 8/1998 |
| JP | 2001006713 | | 1/2001 |

OTHER PUBLICATIONS

IPDL Machine Translation of JP 2001-006713.*

Merriam-Webster, Inc., Ninth New Collegiate Dictionary, Copyright 1991 by Merriam-Webster Inc.; p. 108, definition of "asperity".

A. J. Patanella, H. Zhang and H. D. Aspinosa, Tribo-Mechanics of Nano-materials, http://clifton.mech.northwestern.edu/espinosa/Nano Materials.html, pp. 1-6.

Internet publication www.suppliersonline.com/propertypages/254SMO.asp, Material Property Data for Stainless Steel 254SMO, 1 sheet.

Internet publication www.suppliersonline.com/Research/Property/metals/2195.asp, Properties of Super Alloy Hastelloy C276 alloy, 1 sheet.

Based on PCT Search Report dated Oct. 18, 2006 corresponding to the subject application, (PCT/US05/28469).

* cited by examiner

BIPOLAR PLATE WITH ENHANCED STABILITY

FIELD OF THE INVENTION

The present invention relates to fuel cells, which generate electricity to power vehicles or other machinery. More particularly, the present invention relates to a bipolar plate which is coated with a corrosion-resistant coating of a high-grade stainless steel using thermal spraying techniques to impart fluoride resistance to the bipolar plate when used in a polyelectrolyte membrane (PEM) fuel cell.

BACKGROUND OF THE INVENTION

In recent years, much research has been devoted to the development of fuel cell technology, particularly for automotive applications. Fuel cell power plants have shown efficiencies as high as 55%. Furthermore, fuel cell power plants are environmentally-friendly since they emit only heat and water as by-products.

Fuel cells produce energy by combining hydrogen and oxygen to produce water and an end product. In a Polymer-Electrolyte-Membrane (PEM) fuel cell, a polymer electrode membrane serves as the electrolyte between a cathode and an anode. In the PEM fuel cell, multiple fuel cells are frequently stacked in series to form a fuel cell stack. In the fuel cell stack, one side of a flow field plate serves as the anode for one fuel cell while the opposite side of the flow field plate serves as the cathode for an adjacent fuel cell. Because each flow field plate serves as both an anode and a cathode, the flow field plate is also known as a bipolar plate.

Bipolar plates for PEM fuel cells must be electrochemically stable, electrically conductive and inexpensive. The corrosion of metallic bipolar plates in the fuel cell environment accelerates the corrosion process through degradation of the membrane. The degradation products of the membrane include hydrogen fluoride (HF), which accelerates the corrosion process, causing the corrosion process to become autocatalytic in nature. 316L stainless steel has been used as an inexpensive bipolar plate material.

While 316L stainless steel exhibits a fair corrosion resistance to fluoride ions, the corrosion rate increases with the increase in the fluoride ion leach out rate. This problem can be mitigated somewhat by removing the hydrogen fluoride ions from the fuel cell environment or by using higher grades of stainless steel which are more resistant to corrosion by fluoride ions than 316L stainless steel. However, the use of higher grades of stainless steel for the bipolar plate tends to increase the cost of the bipolar plate.

Various methods are known for increasing the corrosion resistance of a corrosion-susceptible substrate. For example, US20030228512 A1 discloses a method of improving the contact resistance of the surface of a stainless steel substrate while maintaining optimum corrosion resistance of the substrate by depositing a gold coating on the substrate. US20040091768 A1 discloses a method of increasing the corrosion resistance of a substrate by providing a polymeric conductive coating on the substrate. U.S. Pat. No. 6,372,376 B1 discloses a method of increasing the corrosion resistance of a substrate by providing an electrically-conductive, corrosion-resistant polymer containing a plurality of electrically conductive, corrosion-resistant filler particles on the substrate.

It has been found that coating the surface of a lower grade stainless steel bipolar plate, such as a 316L stainless steel bipolar plate, for example, with a thin layer of high-grade stainless steel or alloy using thermal spraying imparts a high degree of fluoride ion corrosion resistance to the bipolar plate while maintaining the cost of the bipolar plate within acceptable levels. Only a small amount of the more expensive (more corrosion resistant) alloy is required.

SUMMARY OF THE INVENTION

The present invention is generally directed to a novel bipolar plate which is characterized by enhanced stability and resistance to fluoride corrosion in a fuel cell environment. The bipolar plate of the present invention includes a stainless steel bipolar plate substrate which is typically a low-grade stainless steel, such as 304L or 316L, for example, and a corrosion-resistant coating, which is a higher-grade stainless steel or alloy, coated on the bipolar plate substrate using thermal spraying techniques. The corrosion-resistant coating may be a high-grade stainless steel such as C-276, for example. Other alloys such as 904L, 254SMO and Carp-20, for example, can also be used as coating materials. Accordingly, the corrosion-resistant coating renders the lower-grade stainless steel bipolar plate substrate substantially resistant to fluoride ions in the fuel cell environment. This substantially prolongs the lifetime of the bipolar plate. A cover layer, which may be gold or an organic coating, for example, may be provided on the corrosion-resistant coating to reduce the contact resistance of the corrosion-resistant coating.

The present invention is further directed to a novel method for enhancing the corrosion resistance of a bipolar plate. The method includes providing a bipolar plate substrate, which is typically a lower-grade stainless steel such as 304L or 316L stainless steel, for example; and providing a corrosion-resistant coating on the bipolar plate substrate using thermal spraying techniques. The corrosion-resistant coating may be a thin film of C-276, for example. Alternatively, the corrosion-resistant coating may be an alloy such as 904L, 254SMO or Carp-20, for example. The method may further include deposition of a cover layer on the corrosion-resistant layer to reduce the contact resistance of the corrosion-resistant coating.

BRIEF DESCRIPTION OF THE DRAWINGS

The invention will now be described, by way of example, with reference to the accompanying drawings, in which.

DETAILED DESCRIPTION OF THE INVENTION

According to the present invention, a bipolar plate substrate, which is a low-grade stainless steel such as 304L or 316L stainless steel, for example, is coated with a higher grade of stainless steel using a thermal spray process to fabricate a bipolar plate having an improved corrosion resistance to hydrogen fluoride. Preferably, the cathode side of the bipolar plate substrate is coated with a corrosion-resistant coating to increase the resistance of the cathode side of the bipolar plate to corrosion by chloride or fluoride during operation of a fuel cell. Coating the surface of a low-grade stainless steel bipolar plate substrate with a thin (0.1-2 μm) corrosion-resistant coating of the higher-grade C-276, for example, significantly lowers the corrosion rate of the bipolar plate in a fluoride ion environment while not adding significant cost to the bipolar plate. Alloys which may be coated on the bipolar plate substrate as the corrosion-resistant coating include 904-L, 254SMO or Carp-20 stainless steel, for example.

The contact resistance of the thermally-sprayed stainless steel coating can be minimized by providing a cover layer on the stainless steel coating. The cover layer may be a thin layer (<10 nm) of gold (Au) or an organic coating, for example. Other suitable materials for the cover layer include platinum and its alloys, rhodium, ruthenium and its alloys, and palladium and its alloys. Coating a lower-grade stainless steel or material with a thin, higher-grade stainless steel or material using a thermal spray process according to the invention is cost-effective, since fabricating a thick bipolar plate using a higher-grade stainless steel or material is cost-prohibitive.

Figure 1:
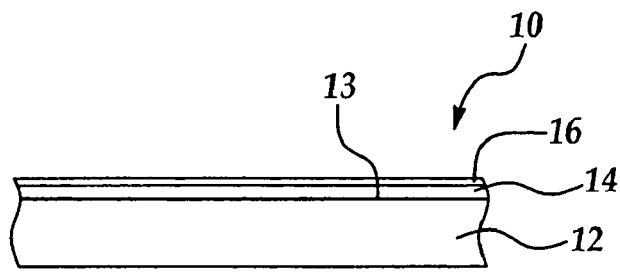
FIG. 1 is a cross-section of a portion of an enhanced stability bipolar plate fabricated by a thermal spray method according to the present invention.

FIG. 1 is a cross-sectional view of an enhanced stability bipolar plate 10, hereinafter bipolar plate, according to the present invention. The bipolar plate 10 includes a bipolar plate substrate 12 which is typically a low-grade stainless steel such as 304L or 316L stainless steel, for example. A corrosion-resistant coating 14, which may be a grade of stainless steel higher than that of the bipolar plate substrate 12, is formed on the outer surface 13 of the bipolar plate substrate 12 using a thermal spray process. The corrosion-resistant coating 14 preferably has a thickness of typically about 0.1-30 μm. Suitable grades of stainless steel for the corrosion-resistant coating 14 include C-276 ss, for example. Alternatively, the corrosion-resistant coating 14 may be an alloy such as 904L, 254SMO and Carp-20, for example.

A cover layer 16, which may be gold (Au) or an organic material, for example, is typically provided on the corrosion-resistant coating 14 to keep the contact resistance of the corrosion-resistant coating 14 low. Other suitable materials for the cover layer 16 include platinum and its alloys, rhodium, ruthenium and its alloys, and palladium and its alloys. The thickness of the cover layer 16 is preferably less than typically about 10 nm in the case of gold coatings and typically about 10~28 micrometers in the case of polymeric coatings.

Figure 2:
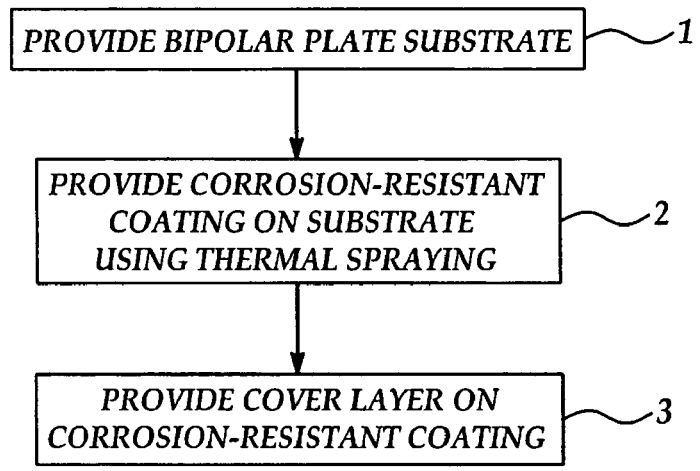
FIG. 2 is a flow diagram illustrating sequential process steps carried out according to a method of fabricating the enhanced stability bipolar plate of the present invention.

FIG. 2 is a flow diagram which illustrates sequential process steps carried out for fabrication of an enhanced stability bipolar plate according to the present invention. In step 1, a bipolar plate substrate is provided. The bipolar plate substrate is typically a low-grade stainless steel such as 304L or 316L, for example, and has the suitable size and configuration for use in a fuel cell stack of a fuel cell.

In step 2, a corrosion-resistant coating is formed on the outer surface of the bipolar plate substrate. The thickness of the corrosion-resistant coating is preferably in the range of typically about 0.1-30 μm. The corrosion-resistant coating may be a higher-grade stainless steel including, for example, C-276 stainless steel. Alternatively, the corrosion-resistant coating may be a corrosion-resistant alloy such as 904L, 254SMO or Carp-20, for example. The corrosion-resistant coating is coated onto the exterior surface of the bipolar plate substrate using a thermal spray process.

The process of thermal spraying proceeds with the formation of molten particles or particles which are able to deform plastically. The particles are transported at high speeds within a heat source towards a surface or substrate upon which deposition occurs. The particles undergo spreading and may create a chemical bond with the underlying surface or substrate. In the case of substrate materials that are not able to form a chemical bond with the particles, the substrate surface is pre-roughened to create a mechanical bond. Each droplet or particle impacts the roughened surface and mechanically interlocks with the asperities on the surface.

In step 3, a cover layer is deposited on the corrosion-resistant coating to minimize the contact resistance of the corrosion-resistant layer. The cover layer preferably has a thickness of less than typically about 10 nm. The cover layer may be, for example, gold (Au) or an organic material, for example.

Table (I) below presents the actual corrosion rates and the normalized corrosion rates for various grades of stainless steel, alloys and titanium. The corrosion rate and normalized corrosion rate of each sample was obtained by soaking the sample in an etching solution (1M $H_2SO_4$+0.1M HF) for an hour at 80 degrees C.

TABLE I

| Alloy | Corrosion rate (g/s) | Normalized corrosion rate |
| --- | --- | --- |
| 304L ss | 8.87E−05 | 1 |
| 353 ss | 2.62E−05 | 0.296 |
| 316L ss | 1.89E−05 | 0.213 |
| Inconl 800 | 1.85E−05 | 0.208 |
| 317L ss | 8.19E−06 | 0.092 |
| Inconl 601 | 5.97E−06 | 0.067 |
| 904L ss | 7.50E−07 | 0.009 |
| 254SMO | 4.17E−07 | 0.005 |
| Carp-20 | 3.61E−07 | 0.004 |
| C-276 | 1.39E−07 | 0.002 |
| Titanium | 8.13E−05 | 0.92 (Limited stability in fluoride ion containing environments) |

Figure 3:
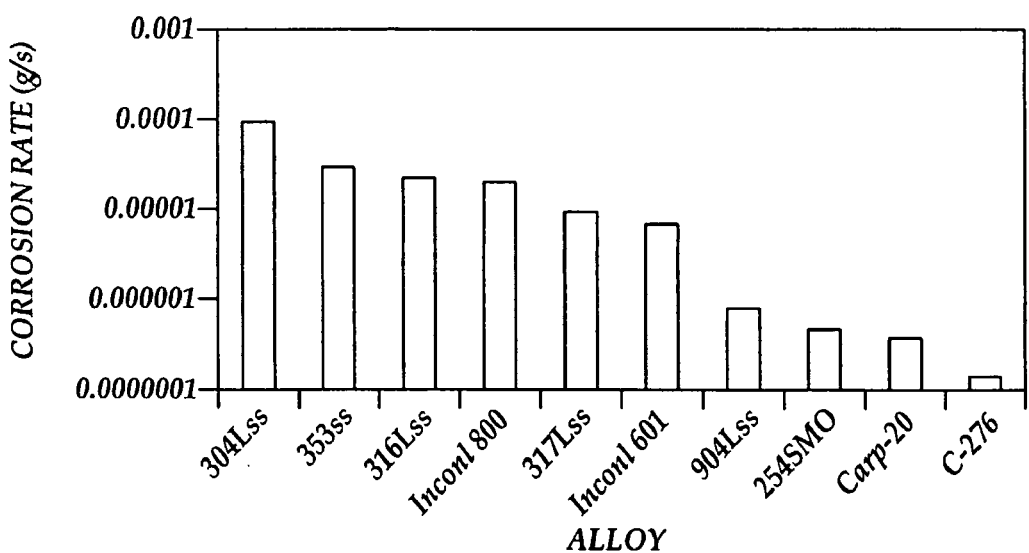
FIG. 3 is a bar graph which compares the corrosion rates (plotted along the Y-axis) of various stainless steel alloys (plotted along the X-axis); in 2000 ppm HF.

Table (I) above shows that the higher the grade of stainless steel/alloy, the better the corrosion resistance of the stainless steel/alloy in a sulfuric acid/hydrogen fluoride mixture. The corrosion resistance of titanium in the same solution is comparable to that of 304L stainless steel. The bar graph of FIG. 3 prevents a visual comparison of the corrosion rates of various grades of stainless steel and various alloys.

Figure 4:
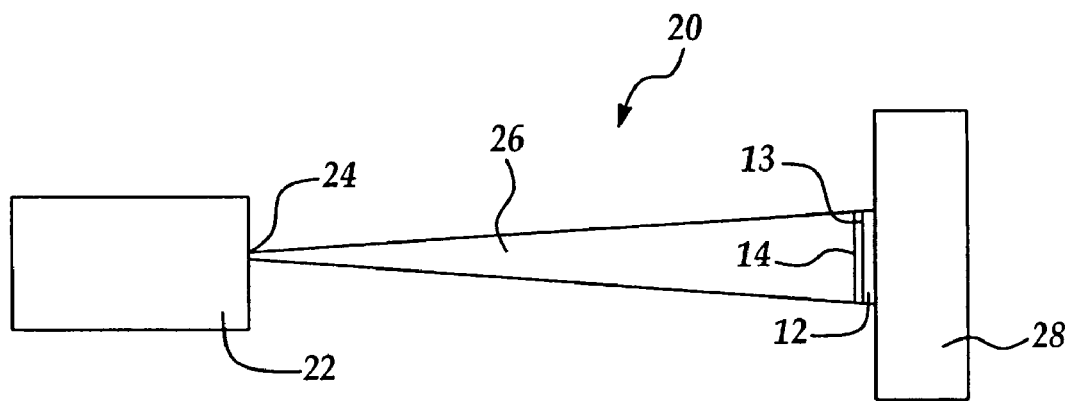
FIG. 4 is a schematic view illustrating a thermal spray process used to fabricate an enhanced stability bipolar plate according to one embodiment of the present invention.

Referring next to FIG. 4, a thermal spray process used to form the corrosion-resistant coating 14 on the bipolar plate substrate 12 according to the present invention may be carried out using a thermal spray apparatus 20, which may be conventional. The thermal spray apparatus 20 includes a gun 22 having a gun nozzle 24. A substrate support 28 is positioned in spaced-apart relationship with respect to the gun nozzle 24. In use, the bipolar plate substrate 12 is mounted on the substrate support 28, with the outer surface 13 of the bipolar plate substrate 12 facing the gun nozzle 24. The stainless steel or alloy to be used as the corrosion-resistant coating 14 is then ejected as molten particles in a spray stream 26 from the gun nozzle 24 against the outer surface 13 of the bipolar plate substrate 12. Accordingly, the stainless steel or alloy corrosion-resistant coating 14 forms a chemical bond with the outer surface 13. In subsequent process steps, the cover layer 16 (FIG. 1) may be coated on the corrosion-resistant coating 14 using a PVD (physical vapor deposition) or other deposition technique known to those skilled in the art.

Figure 5:
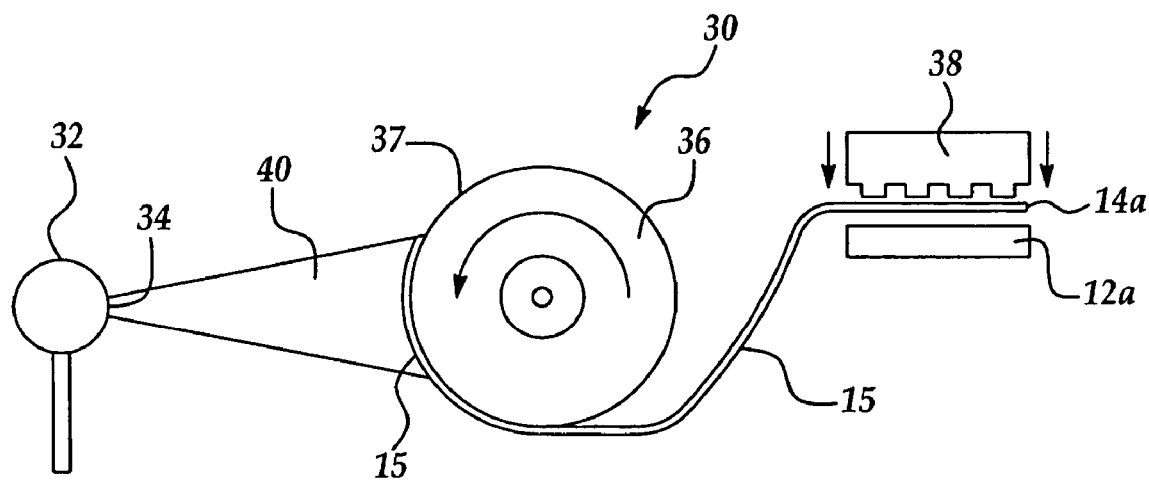
FIG. 5 is a schematic view illustrating a thermal spray process used to fabricate a stamped enhanced stability bipolar plate according to another embodiment of the present invention.
Figure 5A:
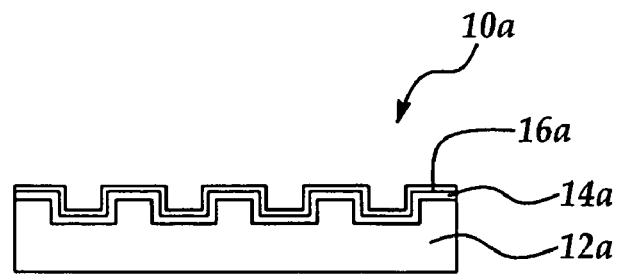
FIG. 5A is a cross-section of a stamped enhanced stability bipolar plate fabricated according to the thermal spray method of FIG. 5.

Referring next to FIGS. 5 and 5A, roller-type thermal spray apparatus 30 in fabrication of an enhanced stability bipolar plate 10a according to the method of the present invention is shown. The apparatus 30 includes a gun 32 having a gun nozzle 34 which is spaced-apart from a rotatable roller 36 having a roller surface 37. In operation of the apparatus 30, the stainless steel or alloy to be used as the corrosion-resistant coating 14a on the bipolar plate substrate 12a is ejected as molten particles in a spray stream 40 against the roller surface 37 of the roller 36. Simultaneously, the roller 36 is rotated in the counterclockwise direction shown in FIG. 5, as indicated by the arrow. Consequently, a stainless steel or alloy coating film 15 is formed on the roller surface 37. The roller surface 37 is a material which does not chemically or physically bond to the stainless steel or alloy coating film 15. The leading portion of the coating film 15 is trained from the roller 36 and positioned between a stamping die 38 and the bipolar plate substrate 12a.

Next, the corrosion-resistant coating 14a, which is the leading end portion of the coating film 15, is stamped between the stamping die 38 and the bipolar plate substrate 12a. This stamps the corrosion-resistant coating 14a into the surface of the bipolar plate substrate 12a to complete fabrication of the enhanced stability bipolar plate 10a, shown in FIG. 5A. In subsequent process steps, a cover layer 16a may be coated on the corrosion-resistant coating 14a using a PVD (physical vapor deposition) or other deposition technique known to those skilled in the art.

While the preferred embodiments of the invention have been described above, it will be recognized and understood that various modifications can be made in the invention and the appended claims are intended to cover all such modifications which may fall within the spirit and scope of the invention.

What is claimed is:

1. An enhanced stability bipolar plate for a fuel cell, comprising:
    a bipolar plate substrate comprising stainless steel and having a roughened surface exposing asperities;
    a corrosion-resistant coating comprising stainless steel over said bipolar plate substrate, said corrosion-resistant coating having a corrosion resistance higher than a corrosion resistance of said bipolar plate substrate, wherein the corrosion-resistant coating is mechanically interlocked with the asperities and wherein the corrosion-resistant coating has a thickness between 0.1 μm and 15 μm; and
    a cover layer provided on said corrosion-resistant coating for minimizing contact resistance of said corrosion-resistant coating.

2. The enhanced stability bipolar plate of claim 1 wherein the substrate comprises 304 L or 316 L grade stainless steel.

3. The enhanced stability bipolar plate of claim 1 wherein said corrosion-resistant coating comprises C-276 grade stainless steel.

4. The enhanced stability bipolar plate of claim 1 wherein said corrosion-resistant coating comprises 904 L alloy.

5. The enhanced stability bipolar plate of claim 1 wherein said corrosion-resistant coating comprises 254 SMO alloy.

6. The enhanced stability bipolar plate of claim 1 wherein said corrosion-resistant coating comprises Carp-20 alloy.

7. The enhanced stability bipolar plate as set forth in claim 1 wherein the thickness of the corrosion-resistant coating is less than about 2 μm.

8. The enhanced stability bipolar plate as set forth in claim 1 wherein said cover layer comprises at least one of gold, an organic material, platinum, platinum alloys, rhodium, ruthenium, ruthenium alloys, palladium or palladium alloys.

9. An enhanced stability bipolar plate for a fuel cell, comprising:
    a bipolar plate substrate comprising stainless steel, the substrate having a first hydrogen fluoride corrosion-resistance;
    a corrosion-resistant coating comprising stainless steel over said bipolar plate substrate, wherein the corrosion-resistant coating is chemical or mechanically bonded to the substrate, wherein the corrosion-resistant coating has a second hydrogen fluoride corrosion-resistance that is greater the first hydrogen fluoride corrosion-resistance, and wherein the corrosion-resistant coating has a thickness between 0.1 μm and 2 μm.

10. The enhanced stability bipolar plate of claim 9 wherein said bipolar plate substrate comprises 304 L or 316 L grade stainless steel.

11. The enhanced stability bipolar plate of claim 9 wherein said corrosion-resistant coating comprises C-276 grade stainless steel.

12. The enhanced stability bipolar plate of claim 9 wherein said corrosion-resistant coating comprises at least one of 904 L alloy, 254 SMO alloy or Carp-20 alloy.

13. The enhanced stability bipolar plate of claim 9 further comprising a cover layer on said corrosion-resistant coating for minimizing contact resistance of said corrosion-resistant coating.

14. The enhanced stability bipolar plate of claim 13 wherein said cover layer comprises at least one of gold, an organic material, platinum, platinum alloys, rhodium, ruthenium, ruthenium alloys, palladium or palladium alloys.

15. The enhanced stability bipolar plate of claim 9 wherein the substrate consists essentially of stainless steel.

* * * * *